April 8, 1958   J. G. JARVIS   2,829,695
ENSILAGE CUTTING UNIT HAVING STRIP TYPE CUTTING BLADES
Filed Nov. 16, 1955   4 Sheets-Sheet 1

Inventor
JAMES G. JARVIS
by: J. Richard Cavanagh

April 8, 1958        J. G. JARVIS        2,829,695

ENSILAGE CUTTING UNIT HAVING STRIP TYPE CUTTING BLADES

Filed Nov. 16, 1955        4 Sheets-Sheet 2

Inventor
JAMES G. JARVIS by: J. Richard Cavanaugh

Inventor
JAMES G. JARVIS

United States Patent Office 2,829,695
Patented Apr. 8, 1958

2,829,695

ENSILAGE CUTTING UNIT HAVING STRIP TYPE CUTTING BLADES

James Gordon Jarvis, Meadowvale, Ontario, Canada, assignor to Grasslander Co. Limited, Milverton, Ontario, Canada Application November 16, 1955, Serial No. 547,211

8 Claims. (Cl. 146—121)

This invention relates to an ensilage cutting unit having replaceable strip type cutting blades operative in accordance with a pressure cutting principle.

Present day attempts to provide power driven machinery for the cutting of hay, have adhered to the use of a shear cutting principle. With the recent advent of renewed interest in the direct feeding of livestock, straw-cutting machinery has been developed to a point where it is apparent that a shear cutting principle entails an onerous consumption of horsepower in conjunction with breaking up of the material cut to small irregular lengths giving rise to dust, breakage and bleeding of the material being cut. Modern power machinery for cutting hay being limited by the use of a shear cutting principle and attended by a necessarily rougher handling of the material being cut, delivers an inferior product to that attained by the old manual methods and particularly by manually operated pressure cutting devices.

It is a main object of the invention to provide an ensilage cutting unit operative in accordance with a pressure cutting principle in which the cutting blade is easily replaceable and is alignable throughout its length for pressure co-action with co-operating pressure cut supporting surfaces of cutting strips or equivalent surfaces of a drum-like co-acting member.

It is a further object of the invention to provide an ensilage cutting unit which may be easily serviced with crude tools, if necessary and which is adapted for use in various agricultural implements.

It is a still further object of the invention to provide an ensilage cutting unit embodying drive connections therefor in a housing and wherein the unit may be removed with its housing from an agricultural implement adapted to carry the same.

It is a still further object of the invention to provide an ensilage cutting unit adapted to sever straw cleanly and regularly without effecting crushing, bruising or breaking of the same whereby to provide a preferred and more natural food for livestock.

Other objects of the invention will be appreciated by a study of the following specification taken in conjunction with the accompanying drawings.

Figure 1:
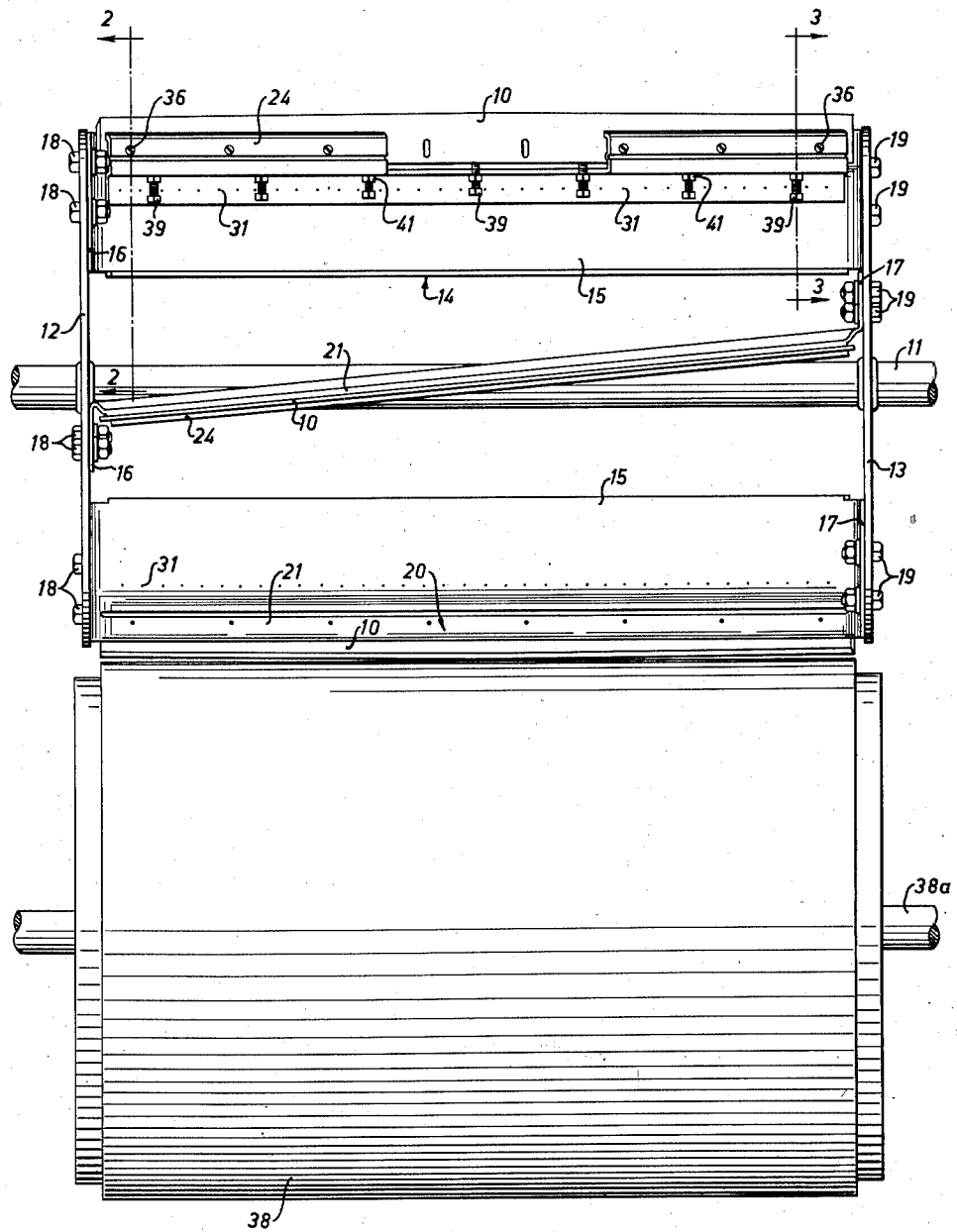
Figure 1 shows a form of pressure cutting device having an expendable strip type cutting blade according to the invention and showing a co-operating cutting drum therefor by way of example.

Referring to Figure 1, expendable pressure cutting blade strips or blade member 10 formed of straight, flat, relatively thin metal such as shear steel, are shown mounted for rotation about the axis of rotatable shaft 11 by end supports shown by way of example in the form of spaced apart discs 12 and 13 having blade mounting assemblies 14 extending therebetween. Each blade mounting assembly embodies a bracket member 15 having oppositely directed flanges 16 and 17 at the ends thereof adapted to be fastened to discs 12 and 13 by means of radially spaced apart bolts 18 and 19.

Figure 2:
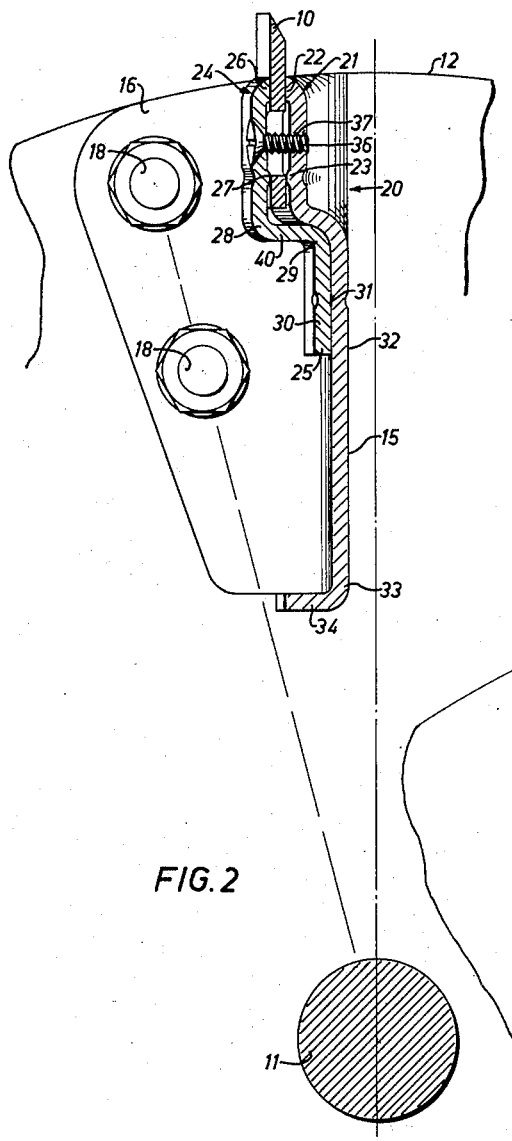
Figure 2 is an enlarged sectional view on the line 2—2 of Figure 1.
Figure 3:
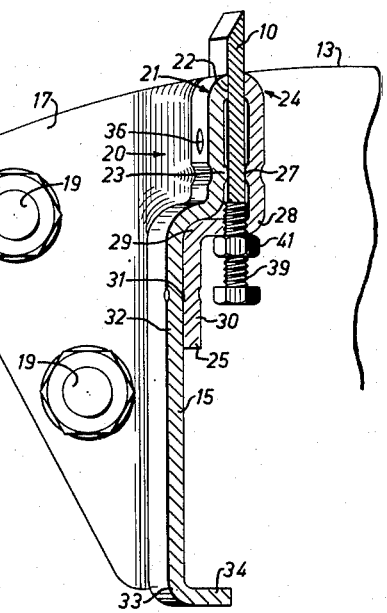
Figure 3 is an enlarged sectional view on the line 3—3 of Figure 1.

As is more clearly shown in Figures 2 and 3, the bracket 15 is preferably formed from a relatively heavy gauge piece of sheet metal, the ends of said piece being first turned to form the flanges 16 and 17 and thereafter the upper region 20 depressed such as by hot stamping methods to form one clamping jaw 21 having a clamping lip 22 and a clamping bead or shoulder 23 spaced therefrom and parallel thereto formed by a creasing or indenting operation. A co-operating or second clamping jaw 24 is formed from a separate strip of sheet metal 25 and embodies a similar clamping lip 26 and gripping shoulder or bead 27. In this case, however, the strip is bent or forged as at 28 and 29 to provide a supporting base or flange 30 adapted to be spot welded at a series of points 31 to the web portion 32 of the bracket 15. While it is preferred that the flange 30 of strip 25 be spot welded to the web 32, it may be fastened in any other suitable manner. The inner edge 33 of the web 31 is inturned to provide a flange 34 assisting in stiffening of the bracket.

Figure 4:
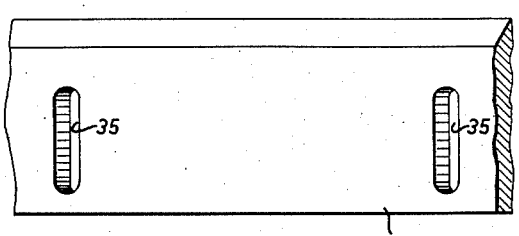
Figure 4 is an enlarged view of a portion of an expendable cutting blade according to the invention.

A pressure cutting blade 10 of the invention shown in more detail partially in Figure 4, is set between the clamping jaws 21 and 24. The mounting openings or slots 35 of the blade are aligned with the clamping screws 36 extending from one of the jaws through a blade slot 35 for threaded engagement as at 37 in the other clamping jaw. Referring also to Figure 1, a bracket carrying a cutting blade is brought into registry with the co-operating drum 38 on shaft 38a disposed in parallel spaced apart relation to shaft 11, in such manner that each end of the blade is first positioned for engagement with the surface of the drum and the endmost clamping screws 36 are tightened. The remaining clamping screws are left relatively loose until the cutting blade is adjusted along its length for engagement with the surface of the drum 38 by means of adjusting screws 39 threadably supported by the intermediate flange 40 of the clamping strip 25. Each adjusting screw 39 is turned to press the cutting blade outwardly to a desired position of adjustment after which the locking nut 41 tightened. Thereafter, the untightened screws 36 may be turned for firm clamping of the blade 10 in the position of adjustment accomplished.

As shown in Figure 1, the brackets are formed to support the cutting blades in a longitudinal inclination of approximately five degrees. The blade remains flat and is not twisted and accordingly assuming that the drum 38 is truly cylindrical, it will be necessary to provide an outward curvature in the blade toward the central regions thereof. The adjustment described effects an outward curvature of the blade toward the mid-regions thereof for engagement with the surfaces of a truly cylindrical drum 38.

It will be apparent that in a construction wherein a pressure cutting blade is supported by a bracket of the invention in a position truly parallel in all respects to the axis of the supporting shaft 11, then the adjustment of the cutting blade described will serve to compensate for wear and distortions in the surfaces of the drum with which each blade comes into registry. The blade and supporting bracket construction of the invention enables the adjustment of the blade to compensate for peculiarities of construction encountered in providing a structure operating in accordance with pressure cutting principles and furthermore, compensates for prior disadvantages in such structures in respect to inefficiency of the cutting action due to wear of supporting surface for cutting, such as the drum surface and wear or damage to the edge of the cutting blade itself.

In this latter respect, the construction of the blade is of utmost importance in that the invention provides a cheap blade formed of a strip of suitable blade material having a series of equally spaced apart slots 35 extending the full length of the blade and which may be formed continuously in a simple manner by production methods and apparatus well known in the arts of fabricating industrial hacksaw blades and the like. Moreover, the cutting blades may be formed of special steels particularly adapted to the service intended.

A strip form of blade of a depth, i. e., strip width, up to about fifteen times the thickness thereof may be adjusted to an adjustment deflection of the order of one one-hundredth of its length without unduly stressing the cutting edge of the material of the blade. The strip blade width or depth should be less than about fifteen times the thickness and the length should be greater than about ten times the width so that an adjustment applying bending of the cutting edge outwardly to a medial deflection of about one one-hundredth of its length will occasion a maximum fibre stress in the cutting edge less than about fifteen hundred pounds per square inch in the shear steel.

The greater the longitudinal inclination of the blade, the greater deflection adjustment is required, to provide a cutting edge curvature to meet the surfaces of a cylindrical drum. Such curvature compensating adjustment may be avoided by providing a slightly longitudinally convex surface on the drum.

Figure 5:
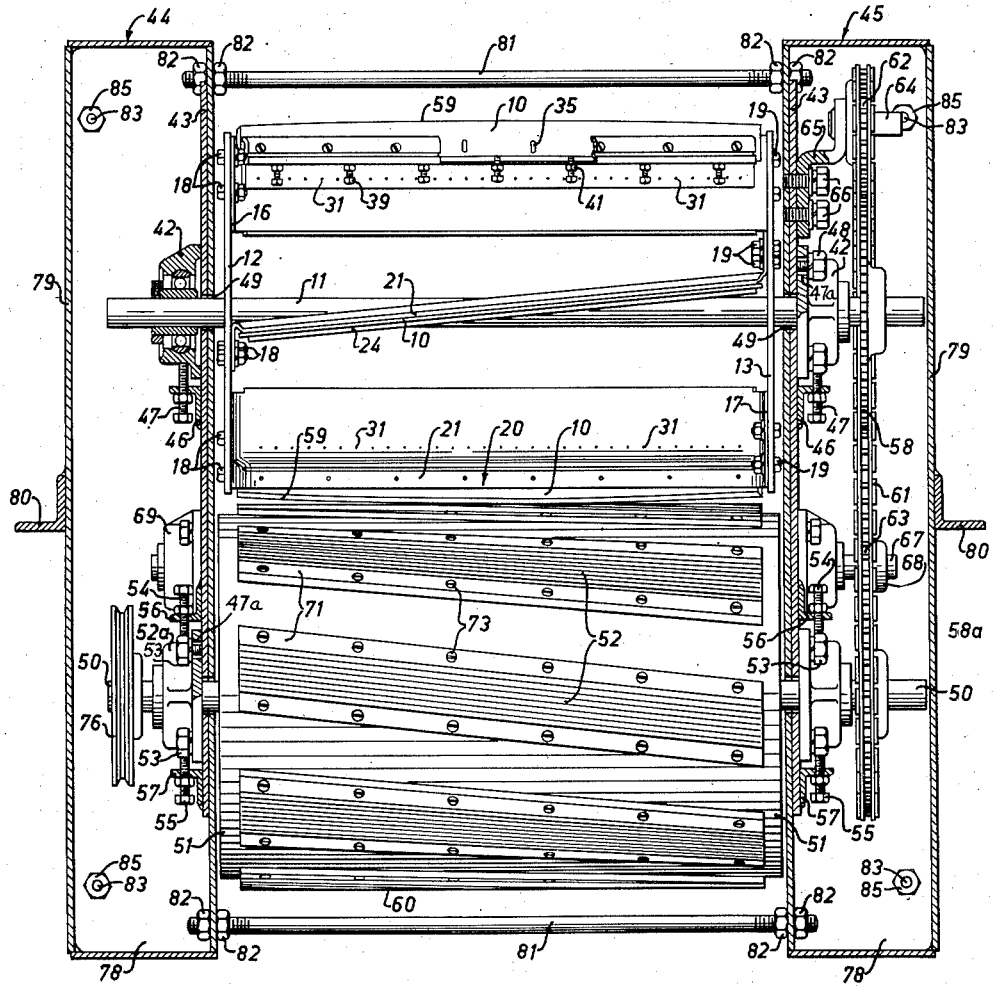
Figure 5 is a sectional view of an ensilage cutting unit according to the invention disclosing a modified form of co-operating pressure cutting supporting surfaces in the form of cutting strips arranged on a drum-like member.

In Figure 5, like numerals indicate like components of the previous figures. Shaft 11 is supported by suitable mounting means in the form of bearings 42 mounted on the inner side walls 43 of the side housings 44 and 45. Brackets 46 support adjusting screws 47 engaging the under surfaces of bearing housings 42 whereby the latter may be adjusted slightly upwardly or downwardly relative to side walls 43 by reason of slots 47a provided in the bearings to accommodate the mounting bolts 48 thereof so that shaft 11 may be adjusted in the enlarged holes 49 of the side walls. A similar arrangement is provided in the mounting of supporting shaft 50 which supports co-operating cutting means in the form of a drum-like member 51 carrying cutting strips 52 supported thereon for engagement by the cutting blades 10. The bearing housings 52a, however, are adjustable both upwardly and downwardly upon loosening of mounting bolts 53 by means of adjusting screws 54 and 55 supported by brackets 56 and 57. By this means, shaft 50 may be aligned in desired parallel spaced apart relationship with respect to shaft 11.

Figure 7:
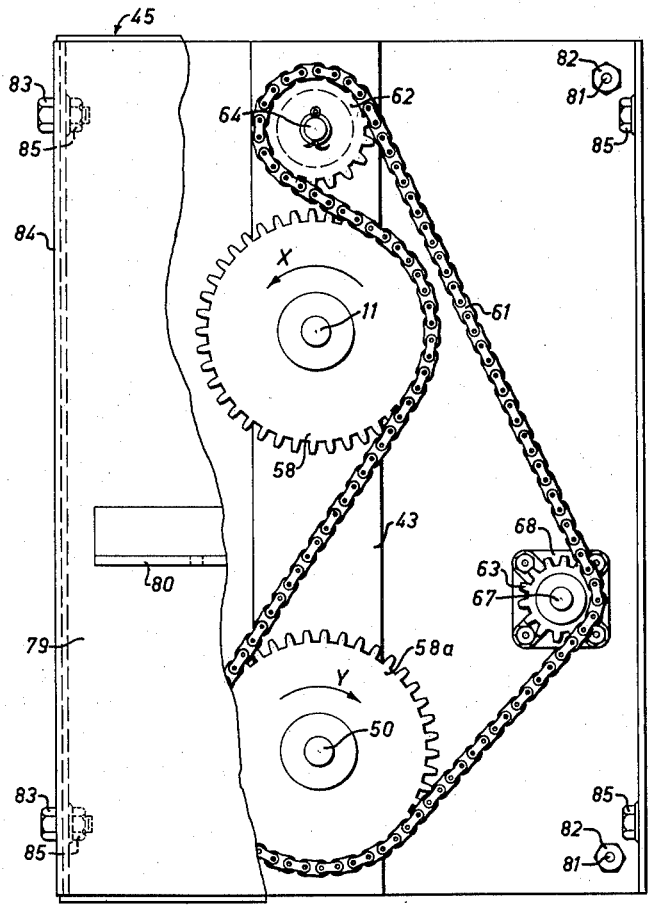
Figure 7 is an elevation of the right-hand portion of the unit of Figure 5 showing a portion of the cover removed to reveal a drive connection between components thereof.

As shown in Figure 7, shafts 11 and 50 carry sprockets 58 and 58a of such relative size that the peripheral speed of the cutting edges 59 of blades 10 will be the same as the peripheral speed of the pressure cutting supporting surfaces 60 of the cutting strips 52. Thus where the surfaces 60 are formed to move on a much larger radius of rotation than the cutting edge 59 as may be preferred for the cutting of difficult materials, for example, straw of high moisture content, then the sprockets 58 and 58a must be of such relative effective diameter each to the other that the peripheral speeds of the cutting supporting surfaces 60 and the blade cutting edges 59 are identical and the cutting edges synchronize in speed with the surfaces of the cutting strips. Synchronization is maintained preferably by employing a chain 61 shown passing about the two idler sprockets 62 and 63 in a manner providing opposite directions of rotation X and Y of shafts 11 and 50. Idler sprocket 62 is supported on stud shaft 64 of adjustable bracket 65 supported by bolts 66 on the inner wall 43 of side housing 45. Idler sprocket 63 is preferably fastened to a shaft 67 passing through a bearing 68 and extending for support in a corresponding bearing 69 on the opposite inner wall 43 of the other side housing 44.

Figure 6:
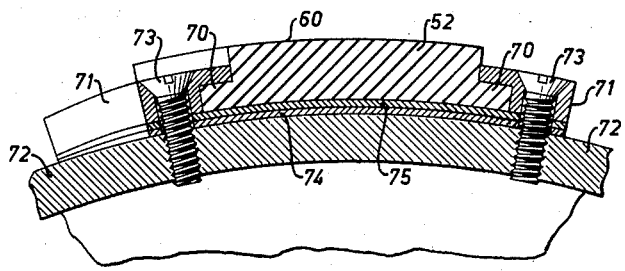
Figure 6 is an enlarged sectional view of one of the cutting strips on the drum-like member of Figure 5.

The cutting strips 52 may be formed of any suitable material such as rubber, scrap rubber belting, hard wood, bamboo or resin impregnated materials and preferably embody flanges 70 as shown in Figure 6 adapted to be gripped by clamping strips 71 fastened to the member 51 in this case taking the form of a cylinder 72 by means of screws 73. Preferably, shim strips 74 and 75 are inserted under the cutting strips 52 to compensate for wear in the pressure cutting supporting surfaces 60 thereof. Therefore, shims 74 and 75 are supplied in the first instance as accessories to be assembled under the cutting strips as may be required after use of the cutting unit for a substantial period of time. They are therefore of greatest utility in difficult to service areas and are otherwise not generally required.

In order to compensate for the longitudinal inclination of the cutting blades 10 as preferred herein, the cutting strips are likewise longitudinally inclined substantially as shown and may be contoured by filing or the like. Preferably according to this invention the surfaces 60 are cylindrical; that is, they may form a part of a truly cylindrical surface about the axis of shaft 50 in which case the cutting edges 59 of the cutting blades 10 will necessarily be adjusted to a corrective curved contour by the adjusting screws 39 substantially as shown.

Either shaft 11 or shaft 50 may carry a pulley wheel 76 adapted for drive connection by means of a belt to a suitable drive motor (not shown). The side housings 44 and 45 embody outwardly directed walls 78 to which are bolted side covers 79 carrying mounting flanges 80 welded thereto. Suitable spacers in the form of the rods 81 extend between the inner side walls 43 at convenient locations and are fastened thereto by means of nuts 82.

It will be apparent that the device disclosed in Figure 5 may be removed from a utilizing farm implement as a unit and serviced in relation to the chain drive mechanism. Removal of the outer cover 79 of the side housing 45 is effected by unfastening bolts 83 passing through the overturned lip 84 of the outer cover 79 into the nuts 85 welded to the outwardly extending walls 78 of the housing. If desired, one complete side housing may be removed without disturbing the mounting of the remaining components of the unit in the other side housing. Likewise, other components of the device shown may be serviced without requiring substantial takedown of the remainder of the device.

The shafts 11 and 50 capable of simple and effective adjustment for parallelization and spacing. In addition adjustment of the radius of action of the cutting strips is also provided in conjunction with adjustment of the radius of action of the cutting blades and of the effective contour of both the cutting strips and cutting blades.

By reason of the light construction of the cutting blades, they are of a character likely to be preferentially damaged in the event of the passage of stones or the like through the cutting unit and in such event, replacement is practical by reason of relatively small cost. The ensilage pressure cutting unit of the invention provides a flexibility of adjustment and ease of replacement of thin strip type cutting blades whereby the pressure cutting action necessary to efficient cutting may be accomplished at all times in the practical sense with a minimum of difficulty and yet under substantially ideal operating conditions.

What I claim as my invention is:

1. An ensilage cutting unit for cutting straw and like forage material comprising in combination: a rotatable cutter shaft supporting a plurality of longitudinally inclined substantially radially disposed pressure cutting blades formed of relatively thin flexible strips of cutting blade metal and having their cutting edges disposed outwardly with the terminal ends of the latter spaced equidistant from the rotational axis of said shaft; structure rigidly supporting said cutting blades; a pressure cutting supporting member including a shaft; mounting means at the ends of said shafts supporting the latter in parallel spaced apart relationship; cutting strips on said pressure cutting supporting member disposed thereby in positions for engagement with corresponding cutting blades of said cutter shaft upon relative counter rotation of said shafts; and means operatively connected between said shafts establishing synchronism of the peripheral speeds of the surfaces of said cutting strips and the cutting edges of said blades upon rotation of one of said shafts.

2. An ensilage cutting unit for cutting straw and like forage material comprising in combination: a rotatable cutter shaft supporting a plurality of longitudinally inclined substantially radially disposed pressure cutting blades formed of relatively thin flexible strips of cutting blade metal and having their cutting edges disposed outwardly with the terminal ends of the latter spaced equidistant from the rotational axis of said shaft; structure rigidly supporting said cutting blades; a pressure cutting supporting member including a shaft; mounting means at the ends of said shafts supporting the latter in parallel spaced apart relationship; cutting strips on said pressure cutting supporting member disposed thereby in positions for engagement with corresponding cutting blades of said cutter shaft upon relative counter rotation of said shafts; means operatively connected between said shafts establishing synchronism of the peripheral speeds of the surfaces of said cutting strips and the cutting edges of said blades upon rotation of one of said shafts; and means on said blade supporting structure for adjusting each cutter blade radially at spaced apart points along its length.

3. An ensilage cutting unit for cutting straw and like forage material comprising in combination: a rotatable cutter shaft supporting a plurality of longitudinally inclined substantially radially disposed pressure cutting blades formed of relatively thin strips of cutting blade metal and having their cutting edges disposed outwardly with the terminal ends of the latter spaced equidistant from the rotational axis of said shaft; a pressure cutting supporting member including a shaft; mounting means at the ends of said shafts supporting the latter in parallel spaced apart relationship; cutting strips on said pressure cutting supporting member disposed thereby in positions for engagement with corresponding cutting blades of said cutter shaft upon relative counter rotation of said shafts; means operatively connected between said shafts establishing synchronism of the peripheral speeds of the surfaces of said cutting strips and the cutting edges of said blades upon rotation of one of said shafts; and means for adjusting the proximity of each cutting strip independently relative to its corresponding cutting blade.

4. An ensilage cutting unit for cutting straw and like forage material comprising in combination: a rotatable cutter shaft supporting a plurality of longitudinally inclined substantially radially disposed pressure cutting blades formed of relatively thin strips of cutting blade metal and having their cutting edges disposed outwardly with the terminal ends of the latter spaced equidistant from the rotational axis of said shaft; a pressure cutting supporting member including a shaft; mounting means at the ends of said shafts supporting the latter in parallel spaced apart relationship; cutting strips on said pressure cutting supporting member disposed thereby in positions for engagement with corresponding cutting blades of said cutter shaft upon relative counter rotation of said shafts; means operatively connected between said shafts establishing synchronism of the peripheral speeds of the surfaces of said cutting strips and the cutting edges of said blades upon rotation of one of said shafts; means for adjusting each cutter blade radially at spaced points along its length; and means for adjusting the proximity of each cutting strip independently relative to its corresponding cutting blade.

5. An ensilage cutting unit for cutting straw and like forage material comprising in combination: a rotatable cutter shaft supporting a plurality of longitudinally inclined substantially radially disposed pressure cutting blades formed of relatively thin strips of cutting blade metal and having their cutting edges disposed outwardly with the terminal ends of the latter spaced equidistant from the rotational axis of said shaft; a pressure cutting supporting member including a shaft; mounting means at the ends of said shafts supporting the latter in parallel spaced apart relationship; cutting strips on said pressure cutting supporting member disposed thereby in positions for engagement with corresponding cutting blades of said cutter shaft upon relative counter rotation of said shafts; means operatively connected between said shafts establishing synchronism of the peripheral speeds of the surfaces of said cutting strips and the cutting edges of said blades upon rotation of one of said shafts; means for adjusting each cutter blade radially at spaced points along its length; means for adjusting the proximity of each cutting strip independently relative to its corresponding cutting blade; and means for adjusting the parallelism of said shafts.

6. A cutting unit mountable on the frame of an agricultural implement and useful for pressure cutting forage material and the like and comprising in combination: two parallel spaced apart rotatable shafts; two axially spaced apart support elements on one of said shafts and fixed thereto; a plurality of circumferentially spaced apart elongated brackets in the form of sheet metal stampings; an angularly directed mounting flange at each end of said bracket; means for fastening said flanges to said support elements to dispose said bracket substantially in a theoretical plane intersecting the shaft supporting said elements substantially midway between the latter; a relatively thin flexible strip of cutting blade metal having a straight cutting edge extending along one edge thereof defining a pressure cutting blade for each bracket; structure on each bracket for clamping said blade thereto; means for adjusting said blade to determine a contour for the cutting edge thereof; axially spaced apart side housings including bearing means supporting said shafts; operatively relating drive means for said shafts within one of said housings; and a rotatable pressure drum on the other of said shafts adapted to cooperate upon rotation of said blades with a portion only of the cutting edge thereof during any cutting instant to sever forage material impinged therebetween.

7. A cutting unit mountable on the frame of an agricultural implement and useful for cutting forage material and the like and comprising in combination: two parallel spaced apart rotatable shafts; two axially spaced apart support elements on one of said shafts and fixed thereto; a plurality of circumferentially spaced apart elongated brackets in the form of sheet metal stampings; an angularly directed mounting flange at each end of said bracket; means for fastening said flanges to said support elements to dispose said bracket substantially in a theoretical plane intersecting the shaft supporting said elements substantially midway between the latter; a relatively thin flexible strip of cutting blade metal having a straight cutting edge extending along one edge thereof defining a pressure cutting blade for each bracket; structure on each bracket for clamping said blade thereto; axially spaced apart side housings including bearing means supporting said shafts; operatively relating drive means for said shafts within one of said housings; a rotatable pressure drum on the other of said shafts adapted to cooperate upon rotation of said blades with a portion only of the cutting edge thereof during any cutting instant to sever forage material impinged therebetween; and an adjusting means on said blade clamping structure providing adjustment of the cutting edge contour of each pressure cutting blade.

8. A cutting unit mountable on the frame of an agricultural implement and useful for pressure cutting forage material and the like and comprising in combination: two parallel spaced apart rotatable shafts; two axially spaced apart support elements on one of said shafts and fixed thereto; a plurality of circumferentially spaced apart elongated brackets in the form of sheet metal stampings; an angularly directed mounting flange at each end of said bracket; means for fastening said flanges to said support elements to dispose said bracket substantially in a theoretical plane intersecting the shaft supporting said elements substantially midway between the latter; a relatively thin flexible strip of cutting blade metal having a straight cutting edge extending along one edge thereof defining a pressure cutting blade for each bracket; structure on each bracket for clamping said blade thereto; axially spaced apart side housings including bearing means supporting said shafts; operatively relating drive means for said shafts within one of said housings; a rotatable pressure drum on the other of said shafts adapted to cooperate upon rotation of said blades with a portion only of the cutting edge thereof during any cutting instant to sever forage material impinged therebetween; an adjusting means on said blade clamping structure providing adjustment of the cutting edge contour of each pressure cutting blade; radially movable adjusting screws forming a part of said blade clamping structure; and means positioning said screws in said structure for engagement with the other edge of said cutting blade providing both an adjustment and a support therefor and determining the contour of the cutting edge of said blade.

References Cited in the file of this patent
UNITED STATES PATENTS

| | | |
|---|---|---|
| 61,933 | Gale | Feb. 12, 1867 |
| 900,255 | Ball | Oct. 6, 1908 |
| 1,786,726 | Absmeier | Dec. 30, 1930 |
| 1,816,329 | Johnston | July 28, 1931 |
| 1,862,256 | Cumfer | June 7, 1932 |
| 2,007,731 | Tomlin | July 9, 1935 |
| 2,399,529 | Willits | Apr. 30, 1946 |
| 2,491,196 | Millard | Dec. 13, 1949 |
| 2,598,820 | Neese | June 3, 1952 |
| 2,735,469 | West | Feb. 21, 1956 |
| 2,751,006 | Lane | June 19, 1956 |

UNITED STATES PATENT OFFICE

CERTIFICATE OF CORRECTION

Patent No. 2,829,695 April 8, 1958

James Gordon Jarvis

It is hereby certified that error appears in the above numbered patent requiring correction and that the said Letters Patent should read as corrected below.

In the grant, lines 2 and 3, for "assignor to Grasslander Co. Limited, of Milverton, Ontario, Canada," read -- assignor, by mesne assignments, to Grasslander (1957) Limited, of Milverton, Ontario, Canada, --; line 12, for "Grasslander Co. Limited, its successors" read -- Grasslander (1957) Limited, its successors --; in the heading to the printed specification, lines 4 to 6, for "assignor to Grasslander Co. Limited, Milverton, Ontario, Canada" read -- assignor, by mesne assignments, to Grasslander (1957) Limited, Milverton, Ontario, Canada --.

Signed and sealed this 18th day of November 1958.

(SEAL)
Attest:

KARL H. AXLINE
Attesting Officer

ROBERT C. WATSON
Commissioner of Patents